May 17, 1932.  F. H. OWENS  1,858,555
MOTION PICTURE AND SOUND REPRODUCING APPARATUS
Original Filed June 4, 1923
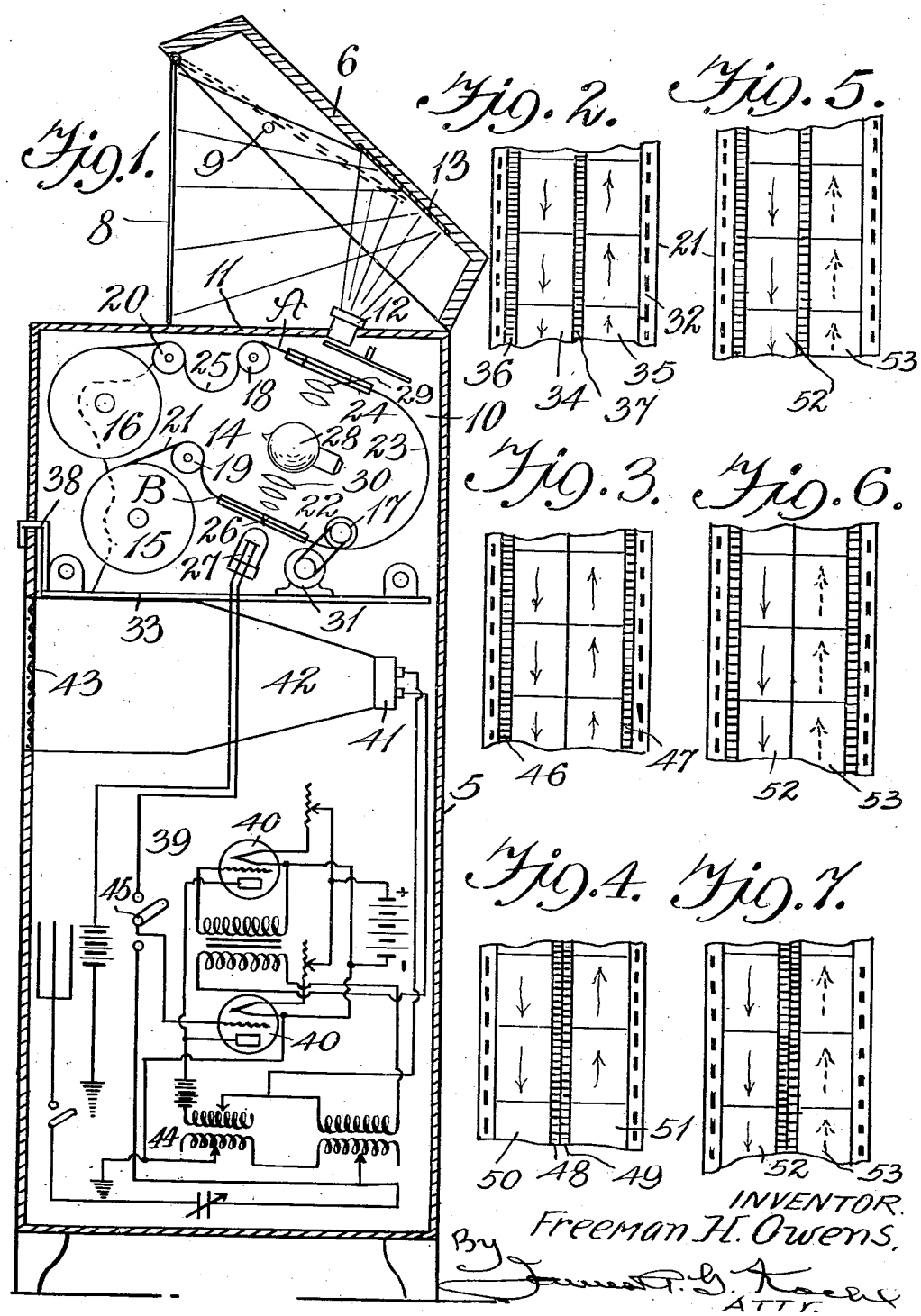
INVENTOR.
Freeman H. Owens,
By _____
ATTY.

UNITED STATES PATENT OFFICE

FREEMAN H. OWENS, OF NEW YORK, N. Y.

MOTION PICTURE AND SOUND REPRODUCING APPARATUS

Application filed June 4, 1923, Serial No. 643,153. Renewed March 19, 1929.

This invention relates to motion picture apparatus and has for its primary object the provision of apparatus of this character wherein a motion picture film of the type employing a sound record may be projected onto the exhibiting screen of a portable cabinet and the sound record part of the film controlled in synchronism with operations of projecting said pictures upon said screen.

Another object of the invention is to provide an apparatus as herein set forth which is used in connection with a film having photographic impressions of telephonic sound waves thereon at one side of the picture frames of the film and adapted to be related to a light sensitive cell or instrument in a sound amplifying circuit, and in this respect, an essential object of the invention is to provide a lamp which shall be common to both the pictures of the film and said sound record part thereof and which will operatively function to project the pictures onto a portable screen while affecting conditions of said light sensitive cell to render said sound amplifying circuit active for the reproduction of sound as the pictures of the film are exhibited.

Another object of the invention is to provide an apparatus of this character which will include two separate electrical circuits, one of which is adapted to be oscillated and operatively controlled by a light sensitive cell which is susceptible to the action of light projected sound waves, and the other of said circuits adapted to be actuated when coupled with a receiving antenna such as those employed in wireless equipment, the combination of the said two circuits being such that at the option of the user of my invention, one may cause motion pictures of any well known form of film to be projected upon a screen while the antenna circuit is put in operation to cause suitable sound to be correlated to and co-act with the pictures exhibited, or, at one's second option, a film containing photographic impressions of pictures and sound waves respectively can be employed and the other of said circuits controlled in synchronism with the projection of the pictures upon said screen.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1 is a diagrammatic view of the invention and its respective electric circuits, and Figures 2 to 7 inclusive are detail views of forms of film employed in connection with the invention.

In carrying the invention into practice, I employ a freely portable cabinet 5 provided with a cover 6 mounted to swing with respect to the top of the cabinet and to be held at an angle thereto when the cover is opened. The purpose of this arrangement will be fully understood as the description proceeds. Hinged or adjustably supported by the cover 6 is an exhibiting screen 8 which may be formed of gauze or other suitable material whereby pictures projected onto the back thereof may be viewed from the front of the screen when the latter is in its vertical position, shown in Figure 1. When not in use, the screen may be folded under the cover as shown in dotted lines, Figure 1 and held in this position by a latch 9.

The cabinet is provided with a compartment 10, the wall 11 of which is provided with a lens 12 angularly disposed and adapted to co-act with a mirror 13 carried by the under side of the cover 6 and a picture projecting or moving picture apparatus 14, the latter mounted in the compartment 10 of the cabinet.

The moving picture apparatus comprises a magazine reel 15; take-up reel 16; a continuously driven sprocket 17, intermittent sprocket 18; and continuously driven sprockets 19 and 20. The film 21 passes over the sprocket 19 and through a presser guide 22, thence under the sprocket 17 from which it is looped at 23 and then extended through a gate 24. From the gate 24, the film is passed over the sprocket 18 from which it is looped at 25 and then passed over the sprocket 20 and to the take-up reel 16. The presser guide 22 is formed with a light slit 26 disposed in line with a light reactive cell 27 of the character shown in United States Letters Patents Numbers 1,301,227 and 1,316,350, granted to T. W. Case. The purpose of this cell will be explained hereinafter. The gate 24 is in parallel spaced relation to the presser guide 22 and the former is in co-acting relation to the lens 12. Mounted between said gate 24 and guide 22 is a lamp 28 and same is interposed between the lens systems 29 and 30. These lens systems are operatively connected to the gate 24 and guide 22 so that light from the lamp 28 will be operatively projected into the respective systems 29 and 30 simultaneously.

A motor 31 in the compartment 10 is employed to respectively move the film in two directions. The film 21 shown in Figure 2 is provided with marginal sprocket openings 32 adapted to mate with the teeth of the sprockets 17, 18, 19 and 20.

Mounted to slide horizontally in the compartment 10 is a table 33 and as illustrated, the cell 27 is supported thereabove in order that it may register with respectively different parts of the film. Table 33 as indicated in Fig. 1 carries motor 31, reels 15 and 16, sprockets 17, 18, 19 and 20 and other parts of the film moving mechanism. The film is provided with two rows of picture frames 34 and 35 and two spaced apart rows of photographic impressions of sound waves 36 and 37, the latter arranged substantially medially of the film and the former at one side of the adjacent sprocket openings 32. The pictures in rows of frames 34 and 35 are similarly disposed on film 21 but the succession of the pictures in row 34 is opposite to the succession of pictures in row 35. This is necessary in order that the motion be shown in the proper sequence on screen 8 when the film is run in one direction for projecting pictures in row 34 and in the opposite direction for projecting pictures in row 35.

The table 33 is adapted to be shifted laterally to cause the cell 27 to mate or co-act with the respective sound record parts 36 and 37 of said film. Said table 33 is provided with an indicating pointer 38 adapted to co-act with a suitable indicating means exteriorly of the cabinet 5. This means is not shown in the drawings but may be of any obvious character as will be understood.

The cell 27 is arranged in a telephone amplifying circuit 39 including two or a suitable number of audions 40 and an amplifier 41, the bell 42 of the latter leading to a sound opening 43 in the cabinet 5. This circuit 39 is adapted to be controlled by variations in the light from the cell 27 as affected by the photographic sound wave impression 36 and 37 of the film. In this manner, these photographic impressions contained on the film are re-converted into light waves by the modulation of light of the lamp 28 by the sound records on film 21 and such waves, through the office of the cell 27 are taken into the audion circuit 39 and formed into sound waves, and the latter amplified and distributed from the cabinet in time with the operation of projecting the pictures of the film.

As described in my co-pending application Ser. No. 630,025, filed April 5th, 1923, and subsequently abandoned, the sound waves upon the film are formed at a distance longitudinally separated from the mating pictures of the film. Hence the object of looping the film to provide the parallel leads A and B, and providing continuous sprockets 17 and 19 and intermittent sprocket 18, the latter serving to move the film intermittently across the gate 24 and sprockets 17 and 19 serving to move the film continuously across the presser guide 22. The presser guide may be of any suitable construction which will firmly support the sound record part of the film against the co-acting light slot in said guide. This holds the film in definite relation to the cell 27 and provides for operative transmission of light through said slit from which it is projected to the light reactive cell 27.

Associated with the circuit 39 is a wireless receiving circuit 44 of any suitable construction. These circuits are connected together so that the audions of the circuit 39 and sound amplifier 41 can be used in the circuit 44. The two circuits may be disconnected by switch means 45 when it is desired to use the wireless circuit by itself. In this manner, it will be seen that a picture film without photographic impressions of sound waves may be employed and sound supplied by the wireless receiving circuit as the pictures are projected onto said screen 8.

In Figure 3 the sound record portions 46 and 47 are arranged immediately next to the respective margins of the film, as shown.

In Figure 4 the sound record portions 48 and 49 are arranged side by side medially of the film and are adapted to co-act with the respective rows of pictures 50 and 51.

In Figures 5 to 7 inclusive, the sound record portions of the films are arranged to co-act with rows of pictures 52 and 53, the latter disposed on the opposite side of the film from the pictures 52. The forms shown in Figures 5 to 7 inclusive are otherwise the same as the forms shown in Figures 2 to 4 inclusive.

What I claim as my invention is:

1. In a motion picture projecting and sound reproducing apparatus, a cabinet structure comprising a box like cabinet having a shelf intermediate its top and bottom portions and having a tiltable cover like member disposed over the top portion, a film strip having sound and picture records thereon, film operating mechanism disposed in the upper confines of said cabinet, means for directing the film substantially along the top wall of said cabinet and a surface of said shelf during its passage through said film operating mechanism, a light source disposed intermediate the top wall of said cabinet and said shelf, means for directing light through the picture portion of said film in an upward direction to said tiltable cover like member, a light sensitive cell disposed adjacent to said shelf, means for projecting light rays from said source downwardly through the sound portion of said film to said light sensitive cell, means above said cabinet for displaying the picture projected to the tiltable cover like member, and means for reproducing sound disposed in the lower confines of said cabinet, said sound reproducing means having its input circuit connected to said light sensitive cell for reproducing sound in accordance with light rays passing through the sound portion of said film.

2. A motion picture projecting and sound reproducing apparatus comprising a cabinet structure made up of a box like cabinet having a shelf disposed intermediate the bottom and top walls thereof and a plurality of angularly tiltable members disposed above said box like cabinet, one of said members being adapted for use as a motion picture projection screen, picture projection apparatus disposed in said box like cabinet above said shelf, a light source also disposed in said box like cabinet above said shelf, a light sensitive cell adjacent to said shelf, a system of lenses disposed on opposite sides of said light source, and film operating mechanism for moving a film having a sound and picture record thereon around said light source and adjacent said system of lenses for projecting the picture record to said angularly tiltable members and the sound record upon said light sensitive cell, and means in the lower confines of said box like cabinet connected to said light sensitive cell for reproducing sound in accordance with the record on said film.

3. In a motion picture projecting and sound reproducing apparatus, a cabinet having a shelf disposed intermediate the top and bottom portions thereof, means disposed above said cabinet for displaying motion pictures, film winding and unwinding apparatus disposed in the upper confines of said cabinet, means for directing a film substantially around the sides of the upper portion of said cabinet during its unwinding and winding operation, said film having a sound and picture record thereon offset one from the other, a light source disposed above said shelf for projecting light rays upwardly through the picture record on said film and downwardly through the sound record on said film, and means responsive to said light rays projected through the sound record portion of the film in the lower confines of said cabinet for reproducing the sound in accordance with the record on said film.

4. A motion picture projecting and sound reproducing apparatus comprising a film having a sound and picture record displaced thereon one with respect to the other, mechanism for unwinding and winding said film, means for guiding said film in a loop during the winding and unwinding process, a light source disposed intermediate the said loop, means for directing light rays from said source upon opposite sides of said loop for projecting the picture record in one direction and the corresponding sound record in the opposite direction, means for displaying the picture thus projected, and means for reproducing the sound from the record on said film.

5. In a motion picture projecting and sound reproducing apparatus, a cabinet structure, a hinged cover on said cabinet structure, a reflecting surface within said cover, an angularly adjustable screen depending from said cover for displaying pictures projected thereon, said screen being adapted to lie adjacent to said cover when not in use, a combined sound and picture projecting apparatus mounted in said cabinet structure, and sound reproducing apparatus actuated by said sound apparatus simultaneously with the projection of pictures on said screen.

6. In a talking motion picture device of the class described, an image projector, a light sensitive element and a common source of light directly therebetween, means to pass a sound and image film through said device, said means continuously passing said film between said source and said light sensitive element and intermittently between said source and the image projector.

7. In a talking motion picture device of the class described, an image projector, a light sensitive element and a common source of light directly therebetween, means to pass a film bearing visual images and a photographic sound record through said device, said means continuously passing said film between said source and said light sensitive element and intermittently between said source and the image projector.

8. In a talking motion picture device of the class described, an image projector, a light sensitive element and a common source of light directly therebetween, a common driving means to pass a film bearing visual images and a photographic sound record continuously between said source and said light sensitive element and intermittently between said source and the image projector.

9. In a talking motion picture device of the class described, an image projector, a light sensitive element and means to pass a sound and image film past said element and said projector in two directions, said film having a plurality of rows of corresponding sound and image photographs thereon to permit running of the film in opposite directions, said sound photographs leading said image photographs in one row, lagging in another row, said lead and lag being equal.

10. In a talking motion picture device of the class described, an image projector, a light sensitive element, a common light and means to pass a film intermittently past said projector, and continuously past said element, means for maintaining a loop in said film between said projector and said light sensitive element, and means to positively drive said film in predetermined spacial relation with respect to said projector and said element in either direction.

11. In a talking motion picture device of the class described, an image projector, a light sensitive element, a common light and means to pass a film past said projector and element, said film having a plurality of series of sound and film images thereon and means to shift the relative position of the beam of said light with respect to one series of sound and image impression to the other.

12. Motion picture and sound reproducing apparatus comprising a light source, a projector and a sound reproducing means in operative relation thereto, means for moving a film bearing a plurality of images and appropriate sound records longitudinally past said projector and said sound reproducing means, and means permitting a relative lateral shifting between the film and the light, projector and sound reproducing means whereby to respectively project and reproduce any of said rows.

Signed at New York, in the county of New York and State of New York, this 31st day of May, A. D. 1923.

FREEMAN H. OWENS.